C. E. JACKSON.
VEHICLE BRAKE.
APPLICATION FILED SEPT. 22, 1909.

956,899.

Patented May 3, 1910.

Witnesses:

Inventor:
Charles E. Jackson

UNITED STATES PATENT OFFICE.

CHARLES E. JACKSON, OF BUSHNELL, ILLINOIS, ASSIGNOR OF ONE-HALF TO HIMSELF AND ONE-HALF TO JAMES HENRY SPIKER, OF BUSHNELL, ILLINOIS.

VEHICLE-BRAKE.

956,899.  Specification of Letters Patent.  Patented May 3, 1910.

Continuation of application Serial No. 468,943, filed December 23, 1908. This application filed September 22, 1909. Serial No. 519,096.

*To all whom it may concern:*

Be it known that I, CHARLES E. JACKSON, a citizen of the United States, residing at Bushnell, in the county of McDonough, State of Illinois, have invented certain new and useful Improvements in Vehicle-Brakes, of which the following is a specification, reference being had to the accompanying drawing.

This invention relates to improved braking apparatus for vehicles and is particularly designed for use in connection with wagons.

It has for its leading object to provide improved apparatus that will compel the brake-beam to move evenly toward the wheels so that the two shoes or blocks carried at or near the ends of said beam will engage the wheels simultaneously and with an equal degree of pressure.

In many of the brake constructions now employed, in connection with wagons, the brake-beam is so moved as to cause the application of the brake shoe at one end of the beam to one wheel in advance of the application of the other shoe to the other wheel, which is not only highly objectionable in that it tends to unduly wear one of the said shoes or blocks much more rapidly than the other, but it also fails to give the desired uniform braking effect at both sides of the wagon at the same time. This objection I overcome by my construction, and, briefly stated, I do it by connecting a horizontally-disposed brake-beam that is slidingly secured beneath the bottom of the wagon-bed to a slotted pivoted lever whose end is provided with a stud or bolt to which the connecting means between the brake-beam and the lever are secured, said stud or bolt also projecting into a guiding device which in the construction shown is a longitudinal slot in a bracket or bar extending lengthwise of the wagon-bed and therefore of course at right angles to the direction of movement of the brake-beam. This slot in the bracket or bar compels the stud or bolt to move in a straight line and the slotting of the lever permits the lever to so move it. That which I believe to be new is set forth in the claims.

Figure 1:
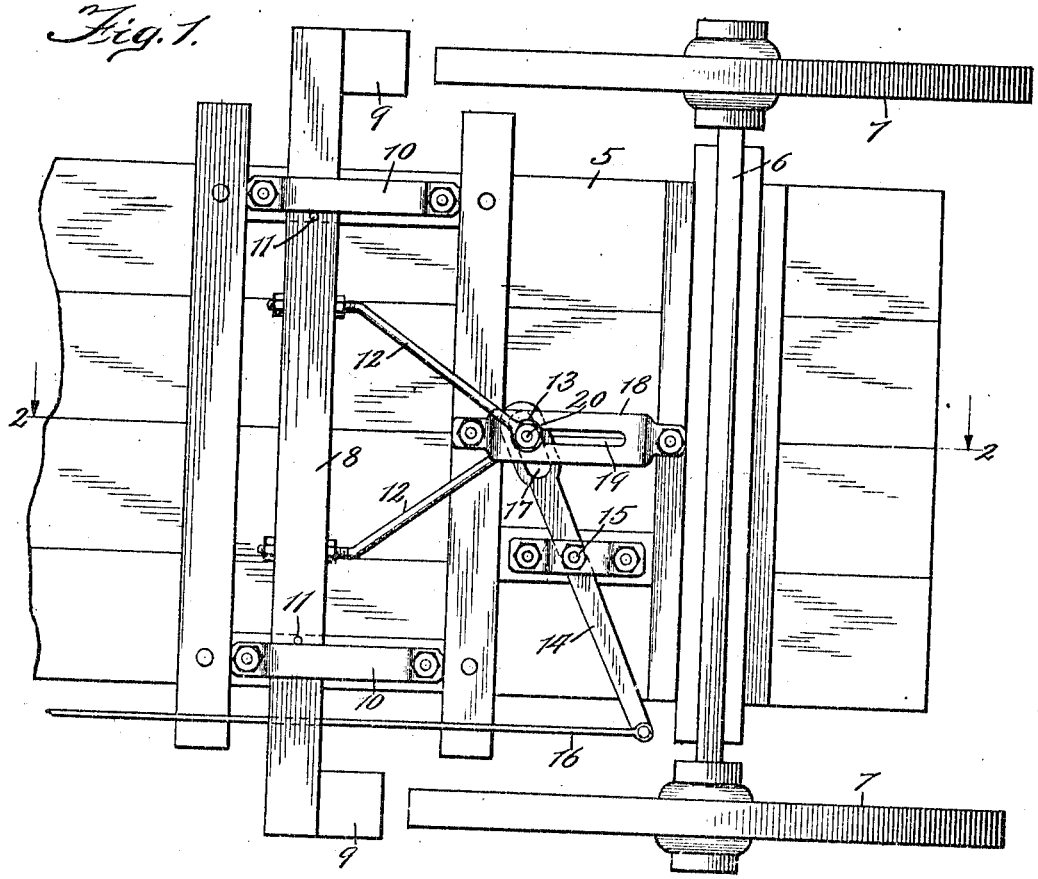
Figure 2:
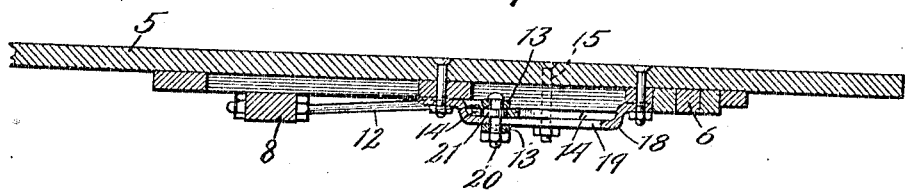

In the drawings:—Figure 1 is a bottom view of the rear portion of an ordinary wagon equipped with my improved braking apparatus. Fig. 2 is a longitudinal section taken at line 2—2 of Fig. 1.

Referring to the drawings:—5 indicates the bottom of an ordinary wagon-bed, to which is secured in the usual manner a rear axle 6.

7 indicates the rear wheels.

8 indicates a brake beam extending transversely of the wagon-bed and provided at its ends with ordinary brake shoes 9.

10 indicates clips, each bolted at its ends to the under side of the wagon bottom 5 and serving as retaining devices for the bar 8. The bar is preferably provided with two short studs 11 each located close to the inner edge of one of the clips 10 and serving to insure the beam being moved evenly back and forth in said clips 10.

12 indicates a pair of rods, the forward ends of which pass through the brake beam 8 and are suitably secured to such beam. In practice, I prefer to provide such ends with screw-threads, as shown, so that by means of the securing nuts shown that are employed to hold the rods to the beam said rods can be adjusted as desired so as to vary the degree of movement of the beam toward and from the wheels so as to compensate for the wearing away of the surfaces of the brake shoes. As shown, these rods 12 converge toward the rear, the rear ends being bent to form eyes 13, as best shown in the sectional view in Fig. 2.

14 indicates a horizontally-disposed lever pivotally secured at 15 to the bottom of the wagon-bed. The outer end of the lever 14 has pivotally attached to it a long forwardly-extending rod 16 which extends toward the front of the wagon and is there suitably connected to a hand or foot lever not shown. The inner end of the lever 14 is provided in the construction shown with a longitudinal slot 17.

18 indicates a bracket or bar extending longitudinally of the wagon-bed and secured to the under face of the bottom of said bed, said bracket or bar being provided as shown with a longitudinal slot 19.

20 indicates a stud or bolt that connects together the two rods 12 and the lever 14, said stud or bolt passing through the eyes 13 of the rods 12 and also through the slots 17 and 19 in the parts 14 and 18, respectively. In order that the strain may be properly borne by the stud or bolt 20, one of the rods 12 is connected near the top of the bolt while the other one is located near the lower end thereof, as best shown in Fig. 2. The bolt also has pivotally secured upon it a small roller 21 of a diameter to fit within the slot 17 of the lever 14, such roller being provided for anti-friction purposes. The arrangement of the parts with respect to the bolt is, as clearly shown in Fig. 2,— first, an eye 13 of one of the rods 12 near the inner end of the bolt, next the lever 14, then the bracket or bar 18, and then the eye 13 of the other rod 12, with of course the roller 21 in the slot of the lever 14, as stated.

With the construction shown and above described, it will be seen that upon a forward pull upon the rod 16 the lever 14 will be turned to draw back the rods 12 and through them carry back the brake beam 8 so as to apply the brake shoes to the wheels. The slot 19 in the bracket or bar 18 forms a guide for the bolt which insures its moving forward and back in a perfectly straight line and hence correspondingly moving the brake beam, with the result that both shoes are applied simultaneously to the wheels and with an equal degree of pressure. This straight forward and back movement is important, as hereinbefore pointed out, and is permitted on account of the operating lever 14 being slotted.

What I claim as my invention and desire to secure by Letters Patent is:—

1. A vehicle brake comprising a shoe-carrying bar, a lever having an elongated longitudinal slot, a bolt carrying a friction roller, said friction roller being received by said slot, rod connections between said bolt and said shoe-carrying bar, said rod connections being disposed in different horizontal planes and having said bolt fixed to their convergent ends.

2. A vehicle brake comprising a shoe-carrying bar, a lever, means for actuating said lever, a bracket having an elongated slot, a bolt, rod connections between said bolt and said shoe-carrying bar, said lever having an elongated slot, and a friction roller carried by said bolt and received by the slot of said lever, said bolt also being received by the slot of said bracket.

3. In a vehicle-brake, the combination with a vehicle-body, a brake-beam and means for slidingly securing the beam in place beneath said body, of a slotted lever, a stud or bolt connected with said lever, a guiding device for compelling a straight backward and forward movement of said stud or bolt when said lever is operated, and connections between said stud or bolt and said brake-beam.

4. In a vehicle-brake, the combination with a vehicle-body, a brake-beam and means for slidingly securing the beam in place beneath said body, of a bracket or bar at one side of said beam, said bracket or bar being provided with a slot that extends in a direction that is substantially at right angles to said beam, a stud or bolt slidingly arranged in said slot, a pivoted slotted lever connected with said bolt, and means connecting said stud or bolt with said brake-beam.

5. In a vehicle-brake, the combination with a vehicle-body, a brake-beam and means for slidingly securing the beam in place beneath said body, of a bracket or bar at one side of said beam, said bracket or bar being provided with a slot extending at substantially right angles to the said beam, a pivoted lever having a slot in one end, a stud or bolt extending through both of said slots, and means connecting said stud or bolt with said brake-beam.

CHARLES E. JACKSON.

Witnesses:
CHARLES HOEKENBERG,
CARL A. REIS.